G. F. SCHAHL.
SWINGLETREE COUPLING.
APPLICATION FILED DEC. 7, 1912.
1,087,986.
Patented Feb. 24, 1914.
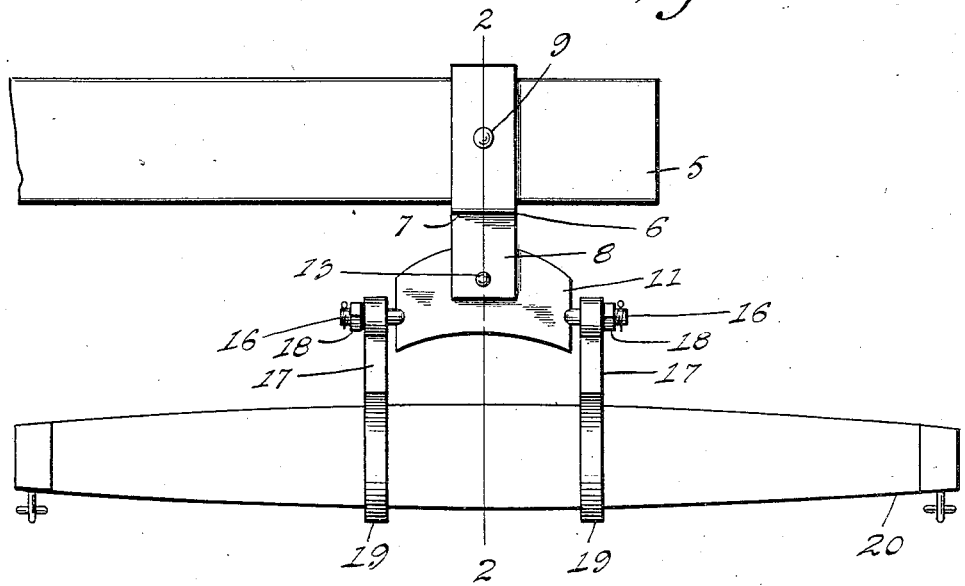
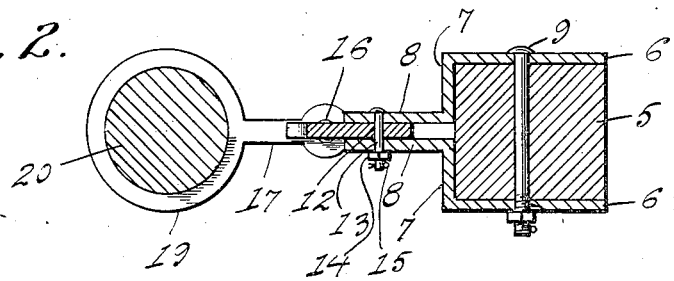
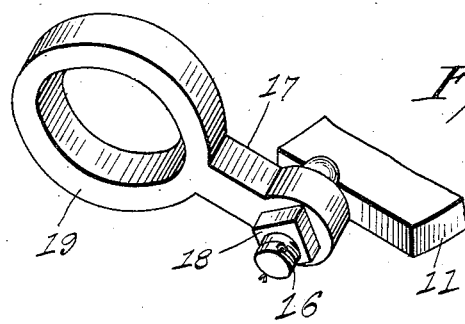
Inventor
G. F. Schahl,
Witnesses
Robert M. Sutphen
A. I. Hurd
By Watson E. Coleman
Attorney

UNITED STATES PATENT OFFICE.

GOTTLIEB F. SCHAHL, OF MOUNT PULASKI, ILLINOIS.

SWINGLETREE-COUPLING.

1,087,986.  Specification of Letters Patent.  Patented Feb. 24, 1914.

Application filed December 7, 1912. Serial No. 735,571.

*To all whom it may concern:*

Be it known that I, GOTTLIEB F. SCHAHL, a citizen of the United States, residing at Mount Pulaski, in the county of Logan and State of Illinois, have invented certain new and useful Improvements in Swingletree-Couplings, of which the following is a specification, reference being had to the accompanying drawings.

This invention relates to an improved swingletree coupling and has for one of its objects to produce a simple, efficient and durable device for connecting or coupling the swingletree to the doubletree.

Another object of the invention is to provide a coupling device of the above character whereby the swingletree is permitted to swing freely both vertically and laterally with relation to the doubletree, said coupling including means connected to the swingletree upon opposite sides of its center whereby the same is materially strengthened and liability of the swingletree being broken at its center thereby obviated.

A still further object of the invention is to produce a coupling for swingletrees which consists of comparatively few elements of simple form which may be easily and quickly assembled without necessitating the employment of skilled labor and may be produced at comparatively small cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a plan view showing a swingletree connected to one end of the doubletree by means of my improved coupling; Fig. 2 is a section taken on the line 2—2 of Fig. 1; and Fig. 3 is a perspective view of one of the members secured upon the swingletree and a portion of the pivotally mounted coupling plate.

Referring in detail to the drawing, 5 designates a portion of a doubletree which may be of any ordinary or approved form. To the doubletree the plates 6 are connected. Each of these plates is provided with an angularly disposed offset portion 7 which extends upon the front edge of the doubletree, the end of the plate being forwardly projected as at 8 from the angular portion 7 thereof. The other ends of the plates 6 extend upon the top and bottom respectively of the doubletree and are provided with openings to receive a connecting bolt 9 which is disposed through an opening in the doubletree and has a nut 10 threaded upon its lower end.

It will be noted that the forwardly projected ends 8 of the plate 6 are spaced apart. Between these spaced ends of the plates 6, the coupling plate 11 is adapted to be arranged. This plate is preferably of the form shown in Fig. 1, and has its front and rear longitudinal edges curved. The plate 11 is provided with a bolt hole 12 to register with similar holes provided in the ends 8 of the plates 6. Through these coinciding openings the bolt 13 is inserted and a nut 14 is threaded upon the lower end of this bolt. A cotter-pin 15 is inserted through an aperture in the end of the bolt 12 to prevent the nut 14 from threading off of said bolt.

Upon each end of the plate 11 a laterally projecting cylindrical arm or stud 16 is formed. The connecting members 17 are provided in one of their ends with openings to loosely receive the studs 16, the ends of said studs being threaded to receive suitable retaining nuts 18. The members 17 are in the form of flat metal plates or bars and are provided upon their other ends with the loops 19. These loops may be of circular or rectangular form and are adapted to receive the swingletree illustrated at 20, said loops being located upon opposite sides of the center of the swingletree and riveted or otherwise rigidly secured thereto.

After the various parts of my improved coupling have been connected and assembled in the manner above described and shown in the accompanying drawing, it will be obvious that the swingletree 20 may swing freely in a vertical or horizontal plane with relation to the doubletree to which it is connected. The coupling is particularly designed for heavy draft teams and by arranging the loops 19 of the connecting members 17 at opposite sides of the center of the swingletree, it will be obvious that the strain upon said swingletree is more equally distributed so that liability of the same breaking at its center will be reduced to a minimum. The device as a whole is also extremely durable and highly efficient in practical use.

It will be obvious that I am not limited in putting the invention into practice to the specific form and arrangement of the elements as shown in the accompanying drawing, and therefore reserve the right to make such alterations and modifications therein as will fairly fall within the scope of the appended claims and as might suggest themselves in view of the peculiar circumstances or conditions which might arise.

Having thus described the invention, what is claimed is:

1. A swingletree coupling comprising supporting plates adapted to be secured to a doubletree and having forwardly projecting spaced ends, a coupling plate pivotally mounted between the spaced ends of said first named plates, and members loosely connected to said plate upon the opposite sides of its pivot and adapted to swing oppositely to said plate, said members being also secured to the swingletree upon opposite sides of its body portion.

2. A swingletree coupling comprising plates adapted to be secured to a doubletree and having forwardly projecting spaced ends, a coupling plate pivotally mounted between the spaced ends of said first named plates for movement in a horizontal plane, said coupling plate being provided upon its ends with cylindrical studs, members loosely engaged at one of their ends upon said studs, and loops upon the other ends of said members to receive a swingletree and support the same for vertical and horizontal swinging movement with relation to the doubletree.

In testimony whereof I hereunto affix my signature in the presence of two witnesses.

GOTTLIEB F. SCHAHL.

Witnesses:
   Geo. Rupp,
   Brooks Aitchison.